United States Patent
Beloussov et al.

(10) Patent No.: US 7,328,225 B1
(45) Date of Patent: Feb. 5, 2008

(54) SYSTEM, METHOD AND COMPUTER PROGRAM PRODUCT FOR MULTI-LEVEL FILE-SHARING BY CONCURRENT USERS

(75) Inventors: Serguei M. Beloussov, Singapore (SG); Stanislav S. Protassov, Singapore (SG); Alexander G. Tormasov, Moscow (RU)

(73) Assignee: Swsoft Holdings, Ltd., Tortola (VG)

( * ) Notice: Subject to any disclaimer, the term of this patent is extended or adjusted under 35 U.S.C. 154(b) by 466 days.

(21) Appl. No.: 10/729,365

(22) Filed: Dec. 8, 2003

Related U.S. Application Data

(63) Continuation-in-part of application No. 10/670,093, filed on Sep. 24, 2003, and a continuation-in-part of application No. 10/401,636, filed on Mar. 27, 2003, now abandoned.

(60) Provisional application No. 60/367,951, filed on Mar. 27, 2002.

(51) Int. Cl.
*G06F 17/30* (2006.01)

(52) U.S. Cl. .................. 707/203; 707/102; 707/2; 707/3

(58) Field of Classification Search .............. None
See application file for complete search history.

(56) References Cited

U.S. PATENT DOCUMENTS

| | | | | | |
|---|---|---|---|---|---|
| 5,701,463 | A | * | 12/1997 | Malcolm | 707/10 |
| 5,706,510 | A | * | 1/1998 | Burgoon | 707/203 |
| 5,724,578 | A | * | 3/1998 | Morinaga et al. | 707/100 |
| 5,832,527 | A | * | 11/1998 | Kawaguchi | 707/205 |
| 5,870,550 | A | * | 2/1999 | Wesinger et al. | 709/218 |
| 5,905,990 | A | * | 5/1999 | Inglett | 707/200 |

(Continued)

OTHER PUBLICATIONS

"Apache: splitting httpd.conf and sharing with Include". John Bokma. Available online at http://johnbokma.com/mexit/2005/01/05/apache-httpd-conf-split.html. Posted Jun. 5, 2005. Accessed May 30, 2006.*

(Continued)

*Primary Examiner*—Jeffrey Gaffin
*Assistant Examiner*—Mark Andrew X Radtke
(74) *Attorney, Agent, or Firm*—Bardmesser Law Group

(57) ABSTRACT

A method of accessing a shareable computer file includes receiving a request to access the shareable computer file, retrieving a file ID from a stub file corresponding to the shareable computer file, retrieving a file name from a database corresponding to the file ID, accessing the shareable computer file if a user has not modified the shareable computer file, and accessing a modified copy of the shareable file stored in the stub file if the user has modified the shareable computer file. A database is generated in operating system space or accessed using the operating system, and includes file IDs and their corresponding file names for shareable computer files. The stub file is generated locally to correspond to the shareable computer file, and includes a modified copy of the shareable computer file if the shareable computer file has been modified, and a link to the shareable computer file if the shareable computer file has not been modified. If the shareable computer file has not been modified, a read-only operation retrieves any of file contents, file position and file size from the shareable computer file. File attributes relating to the shareable computer file can be retrieved from the stub file. The database is provided by the operating system for use by a Virtual Private Server.

36 Claims, 11 Drawing Sheets

After the COW operation all file operations are performed on the stub file

U.S. PATENT DOCUMENTS

| | | | | |
|---|---|---|---|---|
| 5,991,753 | A * | 11/1999 | Wilde | 707/2 |
| 6,477,544 | B1 * | 11/2002 | Bolosky et al. | 707/200 |
| 6,560,613 | B1 | 5/2003 | Gylfason et al. | |
| 6,618,736 | B1 * | 9/2003 | Menage | 707/204 |
| 6,832,248 | B1 * | 12/2004 | Byrnes | 709/223 |
| 6,859,835 | B1 * | 2/2005 | Hipp | 709/227 |
| 2002/0103904 | A1 * | 8/2002 | Hay | 709/225 |

OTHER PUBLICATIONS

"Apache Virtual Host Documentation". Apache Foundation. Available online at http://httpd.apache.org/docs/1.3/vhosts/. Accessed May 30, 2006.*

"Dynamically configured mass virtual hosting". Apache Foundation. Available online at http://httpd.apache.org/docs/1.3/vhosts/mass.html. Accessed May 30, 2006.*

"Multiple Apache Installations HOWTO". eZ systems. Available online at http://ez.no/community.articles/multiple_apache_installations_howto. Posted Jul. 7, 2005. Accessed May 30, 2006.*

"Apache and FrontPage", by Suso Banderas, presented at ApacheCon 2001, Apr. 5, 2001. Available online at http://suso.suso.org/docs/apache_and_frontpage/.*

"Modules and Configuration", available online at http://www.apachetutor.org/dev/config. Last modified Nov. 5, 2005.*

"The NTFS File System" by Microsoft TechNet, available online at http://www.microsoft.com/technet/prodtechnol/windows2000serv/reskit/core/fncc_fil_khzt.mspx?pf=true. Accessed Jan. 3, 2007.*

* cited by examiner

SYSTEM, METHOD AND COMPUTER PROGRAM PRODUCT FOR MULTI-LEVEL FILE-SHARING BY CONCURRENT USERS

CROSS-REFERENCE TO RELATED APPLICATIONS

This application is a continuation-in-part of U.S. patent application Ser. No. 10/401,636, filed Mar. 27, 2003 now abandoned, which in turn claims priority to U.S. Provisional Patent Application No. 60/367,951, filed Mar. 27, 2002, and is a continuation-in-part of U.S. patent application Ser. No. 10/670,093, filed on Sep. 24, 2003, all of which are incorporated by reference herein in their entirety.

BACKGROUND OF THE INVENTION

1. Field of the Invention

The present invention relates to computer file systems and, particularly, to a system and method for providing file sharing in a computer file system to allow for efficient multi-user access.

2. Related Art

Typically, the operating system of a computer system includes a file system to provide users with an interface while working with data on the computer system's disk and to provide the shared use of files by several users and processes. Generally, the term "file system" encompasses the totality of all files on the disk and the sets of data structures used to manage files, such as, for example, file directories, file descriptors, free and used disk space allocation tables, and the like. Accordingly, end users generally regard the computer file system as being composed of files and a number of directories. Each file usually stores data and is associated with a symbolic name. Each directory may contain subdirectories, files or both. The files and directories are typically stored on a disk or similar storage device.

Operating systems such as UNIX, Linux and Microsoft Windows manage computer file systems by defining a file object hierarchy. A file object hierarchy begins with a root directory and expands into a hierarchy of subdirectories like the branching of a tree. The file address is then described as an access path, e.g., a succession of directories and subdirectories leading to the file. This process of assigning a file address is called access path analysis or path traverse. For instance, the path "/r/a/b/file" contains the root directory (/), subdirectories "r", "a" and "b" and then the file. Typically, the processes within an operating system interact with the file system with a regular set of functions. For example, these functions usually include open, close, write and other system calls. For instance, a file may be opened by the "open" function that acquires the file name as a target.

The file system may also include intermediate data structures containing data associated with the file system to facilitate file access. This data is called "metadata," and may include, for example, data corresponding to the memory location of the files, e.g., where the file is located in the hard drive or other storage medium. For example, in the context of a UNIX operating system, these intermediate data structures are called "inodes," i.e., index-nodes. An inode is a data structure that contains information about files in UNIX file systems. Each file has an inode and is identified by an "inumber" (i.e., an inode number) in the file system where it resides. The inodes provide important information on files such as user and group ownership, access mode (read, write, execute permissions) and type. The inodes are generated when a file system is initialized. There are a set number of inodes, which corresponds to the maximum number of files the system can hold.

Usually, computer file systems store this intermediate data concerning the location of stored files as separate structures in the same place where the file content is stored. The functions responsible for file searching (implemented in the operating system kernel), for example, first locate the intermediate data and then locate the file data that is being sought. Directories may also have intermediate data structures containing metadata. File systems may also generate intermediate file data "on the fly" at the moment when the file system is requesting the file, for example. For instance, the NFS (Network File System) used by Sun Microsystems of Santa Clara, Calif., provides for on the fly intermediate data creation.

In addition, intermediate data structures may include reference files or links that are associated with or point to other files. When a link is accessed, the link itself is not opened. Instead, only the file to which the link refers is opened. Thus, the intermediate data structure in a link may contain data referring to other files that are not requested. For instance, the intermediate data structure may contain the path to another file that will be found and opened instead of this reference link. There are several types of links or references. For example, references that include a symbolic name of another file are called symbolic links. References that refer to another file's intermediate structure are called hard links. The type of link used is generally determined by the operating modes supported by the operating system.

File systems may provide several functions. As discussed above, the most basic task of a file system is to provide access to files. File systems may also enhance system performance with additional functions such as, for example, caching, access markers and fault-tolerance.

The multi-user operating mode of a computer system may generally allow the operating system processes of different users to operate simultaneously. Each process within the operating system is usually associated with information that identifies the user. For instance, in a UNIX system, this information is typically an identifier of the user and group on whose behalf this process is being executed. When accessing a file, the operating system identifies requesting the file operation and determines whether the operation is permitted for that user. Generally, this determination may be made upon opening the file, e.g., requesting a function of the type "open." Thus, on the basis of this access information, the operating system may organize different views of the same file system tree based upon selected parameters such as, for example, time, operation type or user information.

To unite different types of computer file systems, these file systems may be mounted. Here, the term "mount" refers to the computer system needing to start utilizing some resource (physical resources, like disk, tape, disk partition/etc, or logical resources, like a file system "on top" of a disk partition, a network printer, etc.), and therefore mounting is a procedure after which this resource becomes available for operations. For any directory inside the file system, it is possible to mount another file system into that existing directory. Thus, one tree of the computer file system appears inside another file tree. The operating system uses a specific system call of the operating system kernel to mount a file system. This system call includes at least two arguments: the mounting point (e.g., the directory inside of the current file system) and the file system itself (e.g., the storage device or memory location where the data resides). Depending on the file system, additional information containing parameters of the specific file system types may be included. During analysis of the access path to the selected data file, the operating system identifies a moment when the path "passes" through this mounting point and "below" this point. A set of operations for the file is defined according to the parameters established during the file mounting process.

The UnionFS file system, developed for a FreeBSD UNIX operating system, implements a similar technique. One feature of UnionFS is that each user can have a different view of the tree of the same file. In order to provide this feature, two trees of the file system are built when mounting UnionFS. The first tree is a read-only tree. The second tree is built in during the user's session and is used for auxiliary purposes. This second tree is defined as an additional parameter when mounting.

When calling a file within the shareable tree, a search is performed in two ways. First, the search may be based on a path name that is computed based on the location of the file. For example, the mounting point of UnionFS may be located at "a/b/u," and the file to be addressed may be at "/a/b/u/c/d/e."

The second tree, mounted to the same point, is located starting from the address "/x/y/." Then an additional address is computed as "/a/b/u/c/d/e" minus "/a/b/u" plus "/x/y/." As a result, the additional address is computed as "/x/y/c/d/e."

Thus, the specific intermediate data structure (e.g., inode) is searched using the computed path name. If the specific intermediate data structure (inode) is found, then it is assumed that the file is found and the requested operation will be performed on this file. If the file is not found, then a second search by the direct address is provided. If the file is not found there either, the system returns an appropriate error code. Otherwise, the system acts according to the requested operation. If the file opens in response to an operation to modify its content or associated data, then the file is first copied to the computed address as described above, and the operation is performed on the new copy. Otherwise, the operation is performed on the file located in the shareable tree by the requested address.

One way to change the search address of the file object and, accordingly, the position of the root file system for a group of processes, is to use a primitive that is analogous to the OS UNIX kernel primitive "chroot." The operation of this primitive is based on the principle of shifting the real root of the file system or "root" directory to some location for a selected group of processes, for instance, for all processes of one user. Then, all file operations inside this process kernel are performed only within the sub-tree of the selected file system.

Another example of this type of system is one based upon "snaps" of the file system, or tree snapshots, in which modifications to the entire file system are chronologically arranged. All modifications made in the file system or any of its parts during a period of time are saved in a separate tree of the file system. Such separate chronologically arranged trees represent the complete history of file system modifications for a discrete period of time. Thus, to determine the file state at a fixed moment of time, the operator searches for the file in the most recently accessed file tree. If the file is not located, then the previous tree is searched.

Similarly, the Mirage File System (MFS) from IBM of Armonk, N.Y., describes a system consisting of a number of trees and a specific file search mechanism that depends on the file type, extension and sequence of requests, among other parameters. One of the principles of this computer file system is the substitution of the file search path, whereby the search path is expanded to other file system locations associated with the file object being searched. For example, this system offers an implementation of a system of snapshots.

U.S. Pat. No. 6,289,356 also describes an example of an implementation of specific intermediate data structures, in which the file system is organized with a strictly regulated mode of modifications records. The disclosed system provides the transition of file system states so that, at any moment of time, the system is in the correct state. Additionally, the system generates snapshots of the file system through doubling an intermediate data structure (e.g., inode) without doubling the files themselves. The system also marks the files chosen to store data file blocks as belonging to some snapshot of the file system. This provides interference with file system functioning at the level of data distribution algorithms.

A robust file system is especially important in multi-user systems, such as, for example, virtual server systems. A virtual server is a server, for example, a Web server, that shares computer resources with other virtual servers. In this context, the term virtual indicates that the virtual server is not a dedicated server. That is the entire computer is not dedicated to running the server software. Virtual computer systems have several applications. For example, virtual web servers are a popular way of providing low-cost web hosting services. Instead of requiring a separate computer for each server, dozens of virtual servers can co-reside on the same computer. In most cases, performance is not affected and each web site behaves as if it is being served by a dedicated server. However, if too many virtual servers reside on the same computer, or if one virtual server starts utilizing an excessive amount of resources, applications such as Web pages, for example, will be delivered more slowly.

In addition to maintaining efficient allocation of resources, providing multi-user access involves other considerations as well, including security, avoiding file corruption and maximizing system efficiency. Accordingly, it is desirable to provide a file system that provides multi-user access but avoids the danger of file corruption, provides security, allows scalability and facilitates the efficient use of limited system resources.

SUMMARY OF THE INVENTION

The present invention relates to a system, method and computer program product for providing a file system that provides efficient multi-user access and file sharing.

More particularly, in an exemplary embodiment of the present invention, the computer file system includes a shareable file tree corresponding to the shareable files in the system. The computer file system allows for multiple users such that each has access to the shareable files. Each user has a user file tree that corresponds to the shareable file tree and initially contains links or pointers to each shareable file. Each user also has a private file area to store files. If a user wishes to access a shareable file to perform an action that does not modify the shareable file, then the user file tree will point to the shareable file and allow the user to access the file.

On the other hand, if the user wishes to access a shareable file and perform an operation that modifies the shareable file, the computer file system will make a copy of the shareable file and place the copy in the user's private file area. Next, the computer file system will modify the user's file tree such that the link that pointed to the shareable file now points to the copy of the shareable file that was placed in the user's private file area. Another option is that the computer file system generates a link or pointer, and stores a copy of the sharable file inside the private area where the user can modify it. The user is then able to access the copy and may modify the copy. Because each user's private file area is not publicly available, any changes made by this user are not visible to any other user. As a result, multiple users can access and emulate modification of shareable files without incurring the risk of file corruption, excessive overhead or compromising system security.

In another embodiment, there is provided a method of accessing a shareable computer file including receiving a request to access the shareable computer file; retrieving a file ID from a stub file corresponding to the shareable computer file from a database or other source, or if the file name is not found, continuing operation with the stub file as if it were the original file; accessing the shareable computer file based on the file ID if a user has not attempted to modify the shareable computer file; and accessing a modified copy of the shareable computer file stored in the stub file if the user attempted to modify the shareable computer file.

A database includes a set of records with file IDs and their corresponding file names for a plurality of shareable computer files. The stub files are generated in a private area (of, for example, a Virtual Private Server) to represent the shareable computer files. The stub file is a modified copy of the original shareable computer file if the user attempted to modify the shareable computer file previously. The stub file can also be used as a special file pointer (or link) to the shareable computer file (if the shareable computer file has not been modified), and can be used by the user in its original form. In such case, the stub file can be a zero-sized file, with an indication that this is a file with special meaning and will be used as stub file (for example, issue a read request).

If the shareable computer file from the sharable tree has not been modified, a read-only operation can retrieve file contents, file position pointer and/or file size from the shareable computer file. File attributes relating to the shareable computer file can be retrieved from the stub file. Each stub file is generated in the private area, during initialization of the private area, prior to retrieving the file ID from the stub file that corresponds to the shareable computer file. The database is maintained in operating system space or externally, and can be used by a file system driver and/or other support programs and daemons.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The present invention is directed to a system and method for providing a file system to allow multi-user access. In particular, one embodiment of the present invention includes using links or pointers to allow multiple users to access a common system file tree, including files relating to the operating system configuration and user services. Accordingly, every user may modify its files, independent of the access moment and the presence or absence of other users, such that the modifications are only visible to the user that changes the file. In the detailed description that follows, like element numerals are used to describe like elements illustrated in one or more of the figures.

Figure 1:
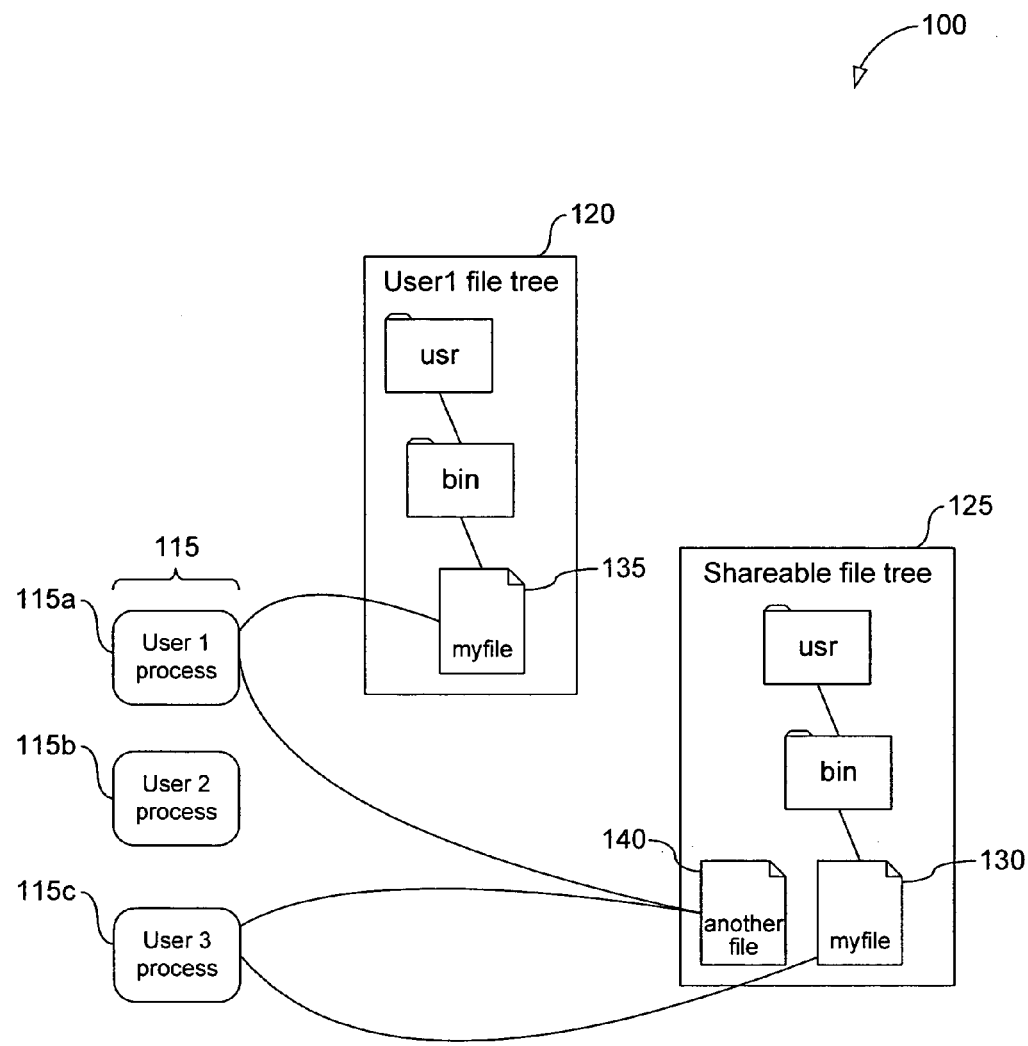
FIG. 1 illustrates file visibility to different users in an exemplary embodiment of the computer file system of the present invention.

As discussed above, one embodiment of the present invention is directed to a system and method for accessing a common file system associated with a computer system that provides for multi-user access. FIG. 1 illustrates an exemplary embodiment of the computer file system of the present invention, indicated generally as 100, and user access thereto. Computer system 100 includes a shared file tree 125 that is associated with the files that may be shared or accessed by the users of computer system 100. Computer system 100 allows for multiple users 115a-c, referred to as Users 1, 2 and 3, respectively. Although three users are depicted in FIG. 1, it should be understood that computer system 100 may be configured to accommodate more or fewer users. Each user 115 has access to the shareable file tree 125. Accordingly, as discussed above, each user may share the file tree 125 to provide multi-user access of the file system of computer system 100.

In addition, each user 115 is associated with a user file tree 120. Each user 115 may access shareable file tree 125 via the user's own copy of user file tree 120. From the user's point of view, user file tree 120 is transparent and tracks the structure of shareable file tree 125, as discussed below. As a result, user file tree 120 allows each user 115 to access files located in shareable file tree 125, including files relating to operating system configuration and user services. Each user file tree 120 is private and preferably may not be accessed by other users without administrative privileges. Accordingly, as discussed below, each user 115 is able to modify its files independent of the other users. As a result, any user 115 is able to access and modify a file regardless of when other users are present on the system or access the file. These modifications to a file are only visible to the user that authored the changes. For example, as shown in FIG. 1, the file entitled "myfile," shown at 130, has a file path "/usr/bin/myfile" on shareable file tree 125. If User 1, shown at 115a, accesses myfile 130 via file path /usr/bin/myfile and modifies this file 130, then the other users, e.g., users 115b and 115c, that access myfile 130 via this same path, e.g., /usr/bin/myfile, only see the original, unchanged file 130. The modified file, shown at 135, is only visible to the user that authored the modified file, e.g., User 1, and may only be accessed via User 1's file tree 120. Similarly, other files that have not been changed will be visible to all users in their original form. For example, "anotherfile," shown at 140, has not been modified by User 1. Accordingly, all users 115 that access the file via the file path /usr/bin/anotherfile will access the file from shareable file tree 125 and view the same, unaltered, file. As a result, multiple users may access and modify shared files without the risk of corrupting the original files.

In conventional multi-user computer systems, restricting access to modified files to the author is generally implemented through directly copying the file system tree for each user. But, as discussed above, this solution requires a great deal of overhead to accommodate multiple copies of the same files for each different user. As a result, this conventional solution is not always possible or efficient due to the additional storage and processing requirements and the adverse effect on system performance.

One embodiment of the present invention utilizes specific link files or pointers to provide multi-user access while minimizing the risk of file corruption. Generally, as discussed above, a link is a specific file type that serves as a reference to other files. Accordingly, upon receiving a request, the link or reference file readdresses the request to another file. Thus, when a link is accessed, the link itself is not opened, but rather, the file to which the link refers is opened. Thus, the intermediate data structure in a link may contain data referring to other files that were not requested. For instance, the intermediate data structure may contain the path to another file that will be found and opened instead of this reference link.

Figure 2:
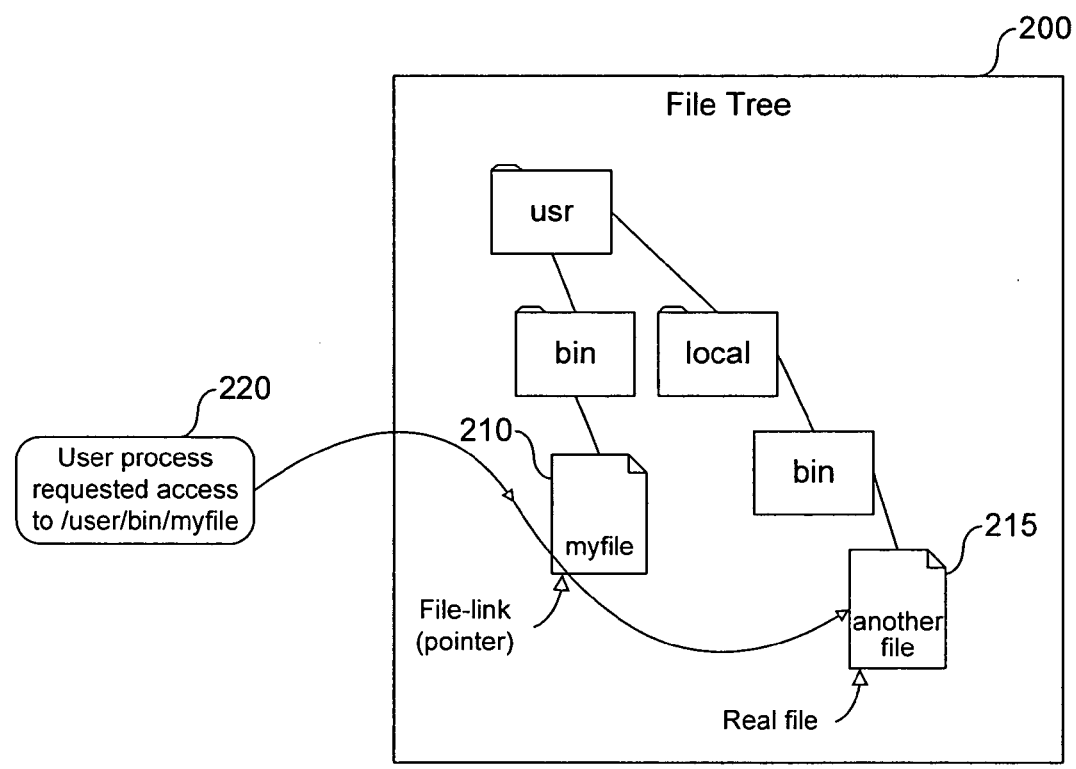
FIG. 2 illustrates requested access to a non-link file in accordance with an exemplary embodiment of the present invention.

For example, in reference to FIG. 2, "myfile" 210, located at path /usr/bin/myfile in file tree 200, is a link file that points to "anotherfile" 215. Accordingly, if user process 220 attempts to open myfile 210, the process will instead open anotherfile 215. The operation of a link file is generally transparent to the user. Thus, a user will generally not be able to determine that the file is in fact a link file, rather than the actual file the user is attempting to open.

Figure 3:
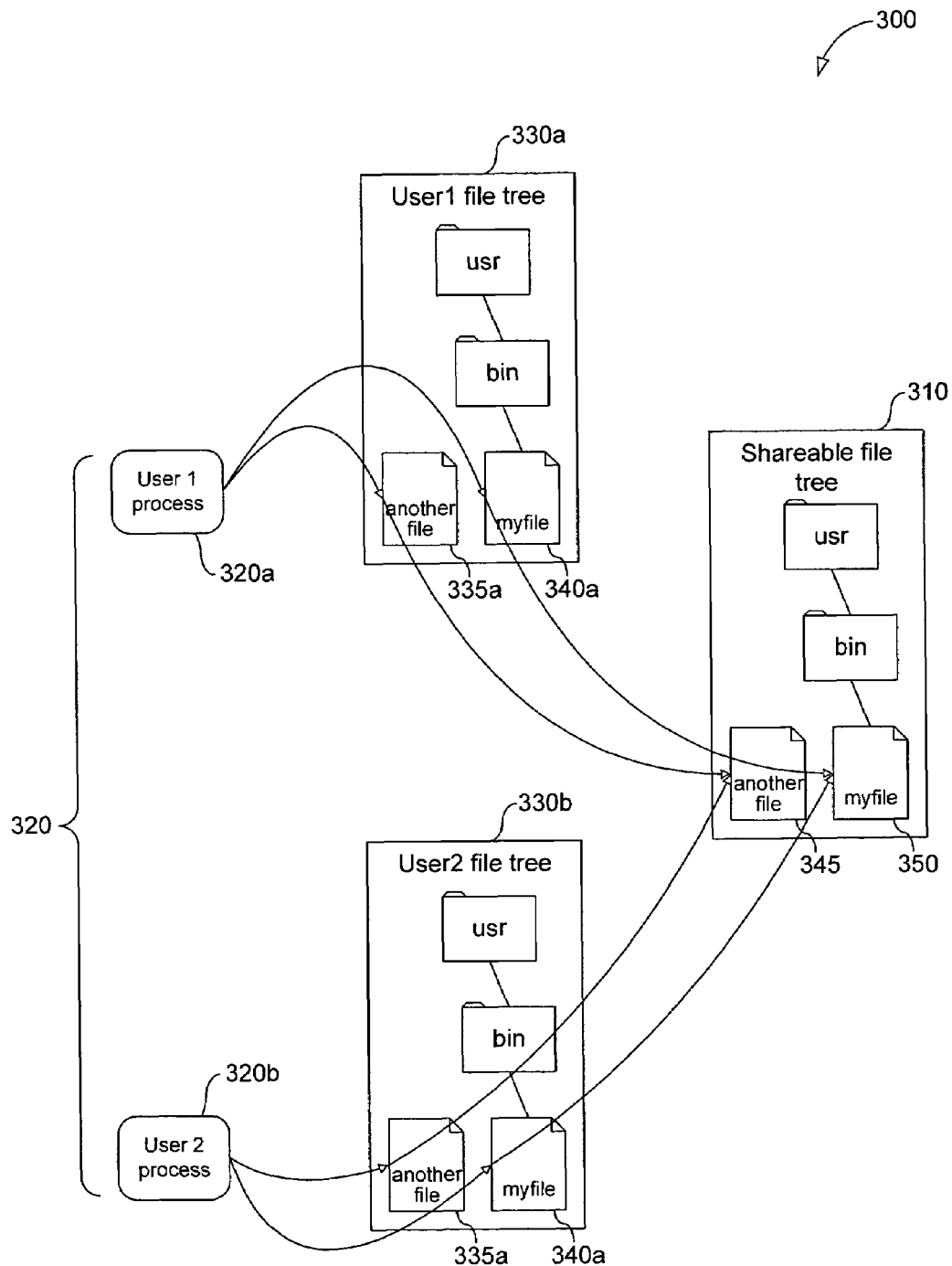
FIG. 3 illustrates the initial state of the user file area in accordance with an exemplary embodiment of the present invention.

FIG. 3 shows an exemplary embodiment of the computer file system of the present invention, shown generally at 300. As discussed above, computer file system 300 includes a shareable file tree 310. In addition, computer file system 300 allows multiple users 320, to access shareable file tree 310. The multi-user mode of computer file system 300 may generally allow the operating system processes of different users to operate simultaneously. Each process within the operating system is usually associated with information that identifies the user. When accessing a file, the operating system identifies the user requesting the file operation and determines whether the operation is permitted for that user. Generally, this determination may be made upon opening the file, e.g., requesting a function of the type "open." Thus, on the basis of this access information, the operating system may organize different views of the same file system tree based upon selected parameters, such as, for example, time, operation type or user information.

Each user 320 that has access to the computer system's shareable file tree 310 also has its own user file tree 330 that contains a directory structure analogous to the shareable file tree 310. But instead of containing a copy of the actual file residing in shareable file tree 310, user file tree 330 contains a link to the corresponding actual file in shareable file tree 310. For example, initially, files 335a and 340b are not copies of the analogous files in shareable file tree 310 (files 345 and 350, respectively). Instead, files 335 and 340 are link files to actual files 345 and 350. Accordingly, as discussed above, each user 320 accesses the actual file through its user file tree 330, which, in turn, links to the actual file in the shareable area. From the user's point of view, this operation is implemented transparently, i.e., the user 320 cannot see the location to which the link or pointer is directed when it addresses a file. In an alternate exemplary embodiment, the user may discover the actual address of the actual file or link only if such feature is specifically provided by the operating system.

Figure 4:
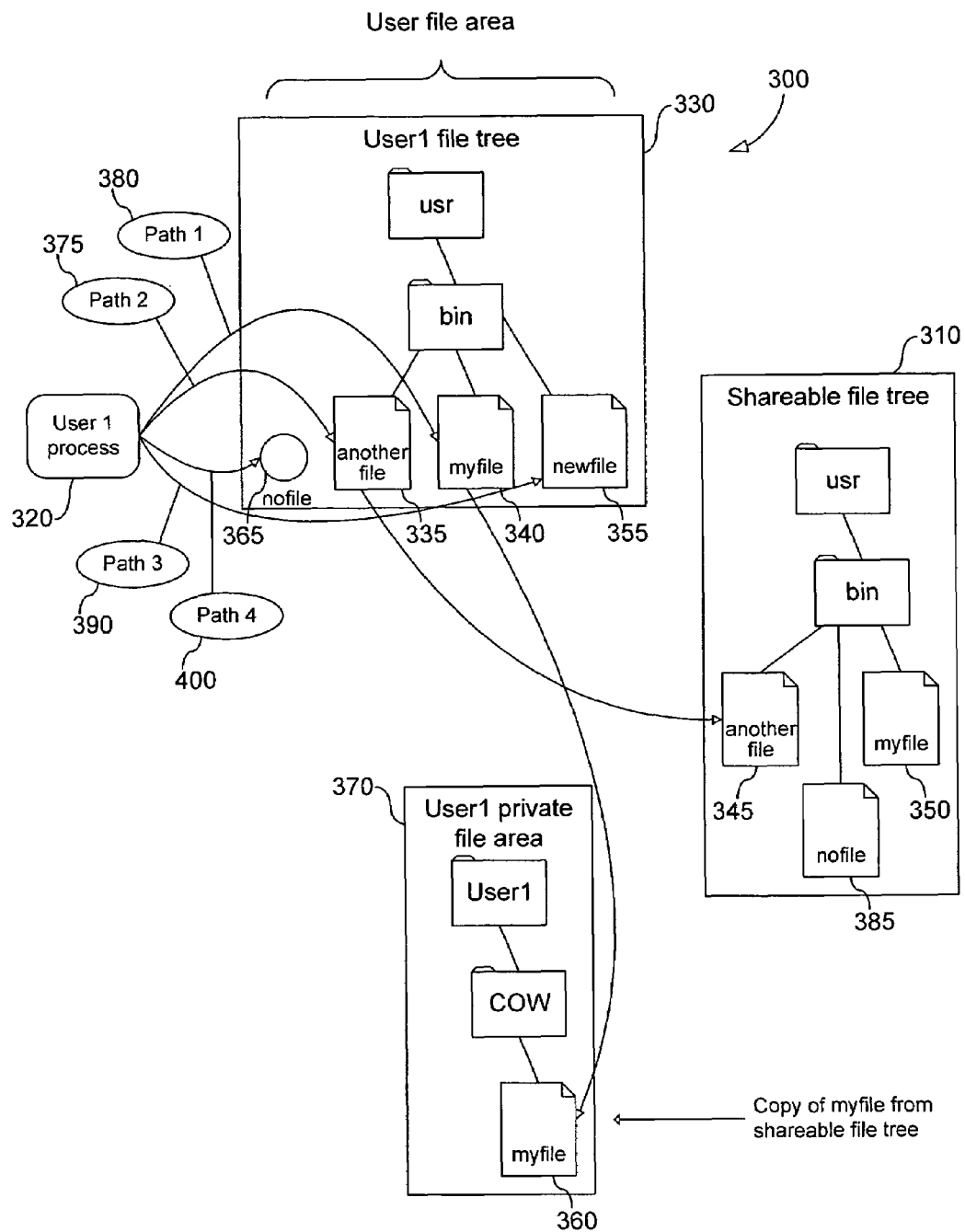
FIG. 4 illustrates an exemplary embodiment of the user file area.

FIG. 4 shows another exemplary embodiment of the present invention. Computer file system 300 includes a shareable file tree 310. Shareable file tree 310 includes several shareable files, including "anotherfile" 345 and "myfile" 350. System 300 also includes a user file area 410. Each user 320 has access to its own user file tree 330 that may be located in user file area 410. As discussed above, user file tree 330 contains files that correspond to files in shareable file tree 310. Accordingly, user file tree 330 includes "anotherfile" 335 and "myfile" 340 that correspond to files 345 and 350 in shareable file tree 310, respectively. But, as discussed above, user file tree 330 does not contain copies of the corresponding files in shareable file tree 310, only links. Accordingly, until the user attempts to modify the files, as discussed below, files 335 and 340 are initially links to actual files 345 and 350.

Generally, all file operations may be subdivided into two categories: (1) operations that modify the file contents or its associated data; and (2) all other operations, e.g., operations that only access the file. If the user process 320 does not request a file operation that modifies the file contents of a file located in shareable file tree 310, system 300 unconditionally opens the file pointed to by the link. For example, as shown in FIG. 4, user 310 may request to access but not modify anotherfile 345. As shown by Path 2 (375), user 310 will open anotherfile 335, the link to the actual anotherfile 345, and be permitted to access this actual file 345. Further operations with anotherfile 345 may be subsequently performed as usual.

On the other hand, if the user operation attempts a modification of any information parameters associated with the file, e.g., its content or length, then system 300 first defines the link points, e.g., to the original file in shareable file tree 310, or elsewhere. In order to allow users to modify file system data, each user receives its own private file area, indicated at 370 in FIG. 4, that may be located in the user file area 410. Private file area 370 may be a selected memory or storage location in or accessible to system 300. In the event that a user 320 wishes to perform an operation that modifies a shareable file in shareable file tree 310 for which the user's file tree 330 contains a link that points to this shareable file, system 300 first copies the shareable file into the user's private file area 370. Next, system 300 modifies user file tree 330 so that the link associated with the shareable file no longer points to the location in shareable file tree 310, but instead points to the location of its copy in user's private file area 370. Thus, system 300 performs a user-transparent operation to allow a user to modify a shareable file without incurring the risk of sharable file corruption.

For example, as shown in FIG. 4, user 320 may wish to access and modify "myfile" 350 located in shareable file tree 310. Because user 320 wishes to modify the file, system 300 will not allow user 320 to directly access and modify the actual shareable file 350. Instead, system 300 will copy the shareable myfile 350 to the user private file area 370. As a result, private file area 370 now contains a copy 360 of the original shareable myfile. Next, system 300 modifies the associated link file, "myfile" 340, located in user file tree 330, to point to copy 360 instead of the original file 350 located in shareable file tree 310. As shown by Path 1 (380), instead of accessing the original file, user 320 will instead access the link file 340 to open the copy 360 stored in the user's own private file area 370. User 320 is now free to modify copy 360 as usual. Any modifications made to this copy 360 of myfile 350 by this user will not be viewable to other users of system 300.

Note that private file area 370 and user file tree 330 may be configured to be accessible to a selected set of users, e.g., a group of users associated with the underlying operating system, rater than just a single user. Note that user 320 may place files into private file area 370 that do not contain links, e.g., pointers to shareable file tree 310. Moreover, user file tree 330 may contain metadata to optimize user access. For example, the links located in user file tree 330 may contain metadata concerning the user's access to the corresponding shareable file. For example, the metadata may allow a user to define permission to files stored in the shareable file tree without copying the files into the private file area 370.

If the link file in user file area 330 already points to a file copy in private file area 370, then the operation will be performed on the copy without any change in user file tree 330. For instance, if user 320 wishes to continue modifying myfile copy 360, as discussed in the above example, then user 320 will access myfile copy 360 via myfile link 340, as shown by Path 1, indicated at 380. Therefore, any further operations with myfile copy 360 will also be transparent to user 320.

User 320 may also freely create new files within system 300. If a user 320 requests the creation of a new file, the new file will be created only in the specific private file area 370. For example, in the exemplary embodiment shown in FIG. 4, user 320, e.g., User 1, wishes to create a new file (e.g., a file not present in shareable file tree 310), entitled "newfile." System 300 preferably allows the user to create this new file, shown as newfile in 410, only in the user's own data area associated with user file tree 330. Accordingly, user 320 may directly access newfile 355, e.g., via file path /usr/bin/newfile, as shown by Path 3, indicated at 390. Accordingly, in a preferred exemplary embodiment, only the user that authored the new file may access or view the new file. In this example, newfile 355 is preferably not viewable to any other user, except User 1. In an alternative embodiment, system 300 may create the new file in the user private file area 370 and modify user file tree 330 to include a link file that points to the new file in user private file area 370. User 320 may now access the new file via the associated link in user file tree 330. User 320 may also allow other users to access the new file, if desired.

User 320 may also delete files within system 300. If the user requests an operation to delete a file that has a link pointing to the shareable data area, then only the pointer will be deleted. The original file and its associated data will be unaffected and accessible by other users. For example, in the exemplary embodiment shown in FIG. 4, user 320, e.g., User 1, wishes to delete the shareable file entitled "nofile" 385 located in shareable file tree 310. Instead of deleting the shareable file, system 300 will instead delete the corresponding link file, nofile 365, located in User 1's own file tree 330, as shown by Path 4, indicated at 400. Once the link file 365 has been deleted, User 1 will not be able to view or access nofile 385, absent intervention by a system administrator, for example. Accordingly, from User 1's point of view, nofile 385 has been deleted, even though it is still available to all other users.

If the user requests deletion of a file that has a link pointing to a copy located in the user's private file area 370, then both the pointer itself and the file copy will be deleted. For example, if User 1 wishes to delete the modified "myfile" 360, then both the link, file 340 and the copy 360 will be deleted. If the user requests the deletion of a file that is not a pointer file and that is located in a specific private data area, e.g., private file area 370, then that file will be deleted as usual. As discussed above, a user's decision to delete a file will not affect another user's existing ability to access a file.

Figure 5:
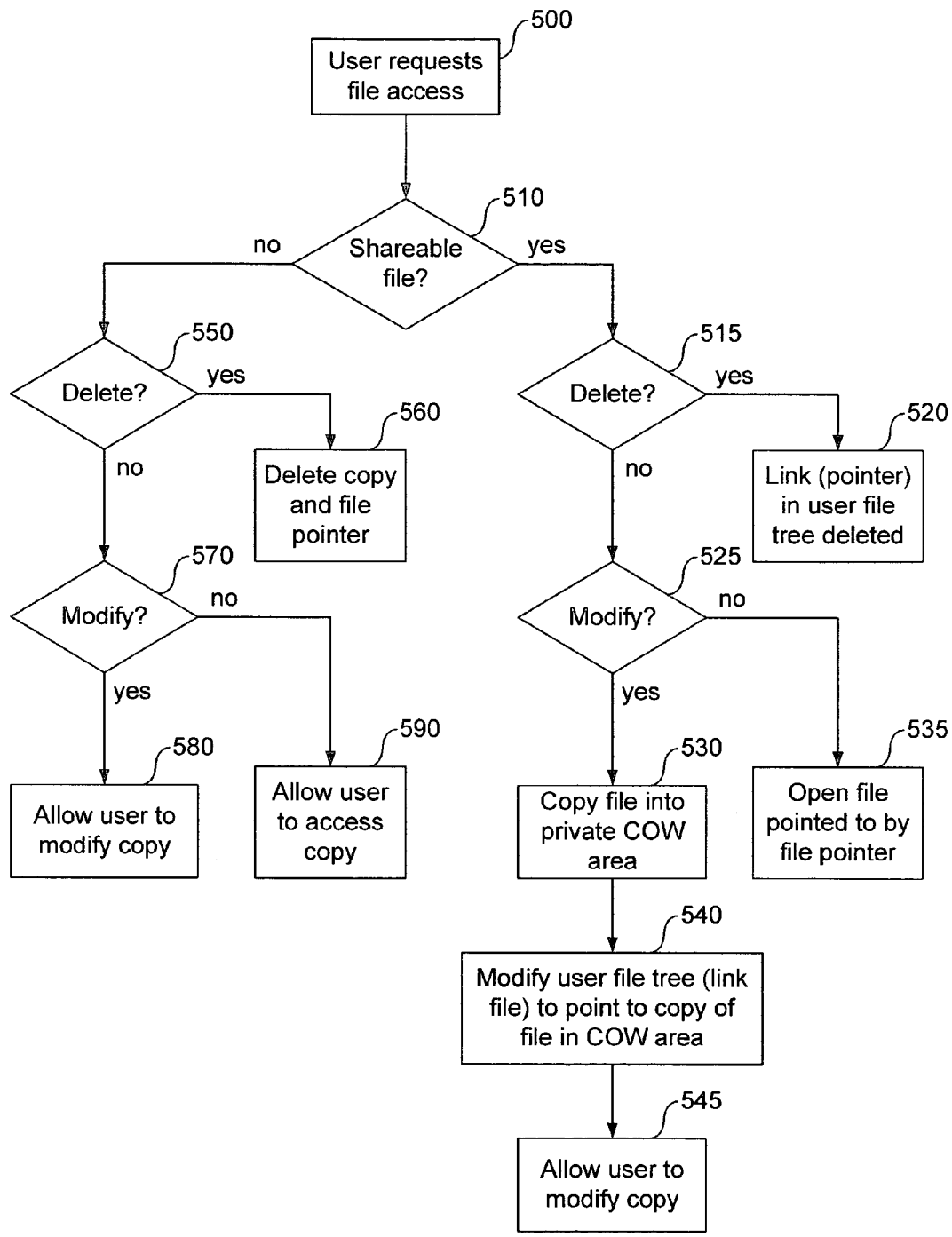
FIG. 5 illustrates an exemplary embodiment of the method of the present invention.

FIG. 5 illustrates an exemplary embodiment of the method of the present invention. At step 500, the system receives a user request to access a file. At step 510, it is determined whether the requested file is a shareable file located in the shareable file tree or a private file. If it is determined that the file is a shareable file, then, at step 515, it is determined whether the user wishes to delete the file. If so, then the link to this file located in the user's file tree is deleted (not the shareable file) at step 520. Otherwise, it is determined at step 525 whether the user wishes to modify the shareable file. If not, then at step 535, the user may access the shareable file via the user file tree. On the other hand, if the user wishes to modify the shareable file, then the system copies the shareable file to the user's private file area, at step 530, modifies the user file tree to point to this copy, at step 540, and then allows the user to modify the copy (not the original shareable file) at step 545.

If it is determined at step 510 that the user wishes to access a private file, then it is determined at step 550 whether the user wishes to delete the private file. If so, the system deletes both the file copy and any associated pointer file. If the user merely wishes to modify the file, at step 570, then the system allows the user to directly modify the private file at step 580. On the other hand, if the user only wishes to access the file, then at step 590, the user is allowed to access the private file.

The system and method of one embodiment of the present invention manages access such that all modifications made by one user in any file of the shareable file tree 310 are independent from the actions of other users and are visible only to the user making the modifications. As discussed above, file manipulation is implemented in the operating system by utilizing links in the file system. Generally, access to files in a file system is provided through specific intermediate data structures, e.g., inodes. These intermediate data structures contain information associated with the file, such as, for example, where the file data may be found on the disk or the time of the last file modification.

As discussed above, in order to provide this type of access, in one embodiment the computer system creates two directories for each user: a first directory to repeat the structure of the shareable tree to store links to files, e.g., user file tree 330, and a second directory to store files copied from the common area, e.g., private file area 370. In one exemplary embodiment, these directories are implemented using a mounting system call that has the required directories as a parameter. During analysis of the access file path, the system will determine when the access path passes in the sub-tree accessible through the mounting point. The appropriate software then controls access to the files inside the directory.

Thus, when searching for a file via the access path, an analysis of the access path is initially provided, and the algorithm determines whether this path intersects any mounting point. If the path intersects the mounting point of the described file system, the processing is performed according to the principles described above. Therefore, the algorithm determines the address within its own private tree of the file system and searches for an intermediate data structure used to access an object. If the structure is not found, the file is considered absent. If the structure is found, then that structure is used to determine the type of file object and, depending on this type of file object, the algorithm either enables operation on the data that the file points to, or provides readdressing to another file, if the file is a link file. If at least one of those structures is not located, the file is considered to be absent.

As discussed above, similar data structures can be generated "on the fly" during interaction with the file system. In this case, these structures are stored only in the random access memory of a computer or in its cache, rather than on the hard drive or similar storage device. For example, those structures generated on the fly may be stored in the temporary buffer data area on the disk or in RAM, or any other memory device.

In order to provide security and system integrity, it is preferable that the computer system limit the extent to which users may mark files, such as creating a specific mark. Generally, the creation and characteristics of a specific mark depends on the underlying file system. For example, for a Linux system, a special file flag, e.g., a sticky bit, may be used as a specific mark because this flag is not used by standard file systems for symbolic links. In other file systems, e.g., Windows NTFS, for example, the system can use other techniques to mark files.

Typically, a specific mark may be a standard link or pointer of the underlying file system. For example, a specific mark may be a symbolic link in a Unix file system. In this case, a user can generate its own symbolic links using a standard OS interface. These user-generated links are distinguishable from the system's own pointers. But, if the system allows normal users (e.g., rather than just system administrators) to generate such links, a user may accidentally or intentionally generate a link pointed to some critical system files that may compromise system security. For instance, the user may generate a link to a "/etc/shadow" file that contains encrypted passwords for the system. Accordingly, the system should not allow users to mark files accessed via "mounted" points. Therefore, these links should only be generated at the direct access to the private user area by means of the underlying file system, and the access path should not contain the mounting point of the file system being described.

For example, the system should allow creation marks for files from "/vz/private" directory tree, but should not allow creation of such marks for files from the "/vz/root" directory tree. Note that in an exemplary embodiment of the present invention, the chroot function may be used to move root file systems for a particular user or set of users into predefined locations and prevent users from accessing unauthorized sections of the file system. Usually, the mounting point is used to provide access through utilization of the chroot primitive, e.g., the procedure of changing the root of the file system. Its functioning is based on the principle of shifting the file system root directory to any selected location. For example, the root directory may be moved to the mounting point of the file system for a certain group of processes, such as, for instance, for all processes of a user. Consequently, all file operations associated with the user processes within the mentioned file system are handled with the transparent substitution of files, as discussed above. As a result, the user then has no opportunity to explicitly generate pointer files having specific marks as interpreted by the file system.

For example, in a virtual environment, users may be restricted to use only a mounted tree, rather than the actual underlying file system. In this case, if the "chroot" function is applied to "/vz/root" for user processes, users will be unable to generate such pointers because the file system will be accessed using "/vz/root." As discussed above, this is advantageous from a security point of view.

Note that, as discussed above, one embodiment of the present invention does not require a mounting system call. However, mounting system calls may be utilized in an exemplary embodiment of the invention. Moreover, an exemplary embodiment of the present invention does not require the creating of a mounting point when the user modifies a file (and generates a copy in its private file area). The file system of an exemplary embodiment of the present invention may use a single mounting point to combine two known file trees (such as, for example, "/vz/private" as a private area and "/vz/template" as a common shared read-only area) into a new, combined tree (for example, into "/vz/root" where all files from /vz/template and /vz/private appear from the user point of view). Accordingly, to generate such an area, the system may use a single mounting call with these two trees as parameters. After the creation of this mounting point, this combined tree will be usable by the user, and all access to files using this path (for example, to file "/vz/root/etc/passwd") will be handled by the file system driver because the path traverse operation will cross /vz/root/. All copy-on-write and other link-related operations will be performed by the file system driver and no additional mounting operations are required.

To modify the content of the shareable area of the file tree so that all changes become visible to all users having access to the area according to the described schema, it is necessary to modify the above-mentioned shared tree, generate specific links to the new files for all users of the system having their own private areas, and delete those links that point to non-existent files. It may also be necessary to generate additional directories in these private areas. For example, to make a change visible, the administrator or user himself should call a special procedure that will generate such a link in the user private area. This link will point to the shared area, and typically it is transparent for the user. The special procedure may generate a "standard" link on the underlying file system, and later mark it as a "magic" link using a special OS interface implemented by a file system driver or OS kernel.

The system and method described above provides a number of advantages over conventional file systems. For example, links are used, instead of implicit computations of the new file address by its path. Moreover, a new file appearing in the shareable tree will become visible to all users at once. In the exemplary embodiment of the present invention, this file is invisible, because this embodiment explicitly generates a link to the new file for each user. Accordingly, among other advantages, the presently disclosed file system provides greater flexibility, simplifies maintenance and provides greater safety by avoiding the risk of file corruption, for example. For example, if a single user makes a mistake during an upgrade procedure, all users in some conventional systems will be adversely affected. In contrast, in an exemplary embodiment of the present invention, the harm may be minimized (e.g., localized to that one user). Another advantage is that fewer calls are required. For example, to find a file in some conventional systems, the system often must make two calls to open a file: one to the file in the private area and, in case of a negative response, another one for the file in the shared tree. In contrast, the computer system of the present invention may use a single call because all redirection is made on the underlying file system driver level.

An exemplary embodiment of the present invention also provides a number of advantages over conventional file systems that require multiple searches or use system snapshots and record changes to different sub-trees at different times. For example, an exemplary embodiment of the present invention utilizes links that allow the system to conduct a single search. Accordingly, an exemplary embodiment of the present invention utilizes less system resources, e.g., there is no need to cache additional directory entries in a file system cache to deal with the additional file paths associated with system snapshots.

Moreover, an exemplary embodiment of the present invention does not use a full duplex of the structure of intermediate data structures of the file system tree and can work with the file system without formal inode structures, such as, for example, the Linux journaling file system called "ReiserFS." Moreover, an exemplary embodiment of the present invention is not limited to operating at the level of the block data storage and the algorithms of data distribution on the disk but, rather, at the level of files and pointers to those files. As a result, it is possible to use practically any underlying file system in an exemplary embodiment of the present invention.

In the description above, link files were used to effect multi-user access to the same file. In the Microsoft Windows operating system, link files with properties as described above are not supported and, therefore, a different approach needs to be taken. The problem is particularly acute in the context of Virtual Private Servers (VPSs) based on the Windows operating system. In that context, a single computer system (usually called a "host") supports multiple VPSs, sometimes as many as hundreds or thousands of VPSs. These VPSs normally share certain system and application files, and have their own private areas for storage of the VPS's own files. Examples of such files may be application files, (e.g., word.exe, wordperfect.exe, etc.) or may be database files, or system files like services.exe. Each VPS needs to have access to these system files. However, for most applications, users do not actually modify these files, but only read or execute them. It is apparent, therefore, that giving each VPS or each user his own copy of these files is impractical. For a one thousand-VPS host, with the Windows operating system and its associated files taking up close to one gigabyte of storage, a total of one terabyte of storage would be necessary to support one thousand VPSs. Another problem is that all these copies of the same file will take up their own portions of virtual memory and RAM during execution—for example, if a single executable file uses only 10 MB of memory during execution, 1000 VPSs will require 10 GB. A different approach is clearly necessary. One advantage of both the Unix and Microsoft Windows implementations (for sharing of data on disk and in RAM) is that all files are stored in a shared tree, and, therefore, if a user does not attempt to modify it, the data can be shared between each instance of a VPS on a disk (which eliminates disk usage overhead, because each file is stored as a single copy and is typically unique for each VPS, with stub file size being 0). Also files can be shared in RAM, meaning that each Virtual Private Server, while attempting to run "own" common files referred to shared tree via a stub file will share in memory a single copy of executable code. This approach significantly enlarges scalability level.

Figure 6:
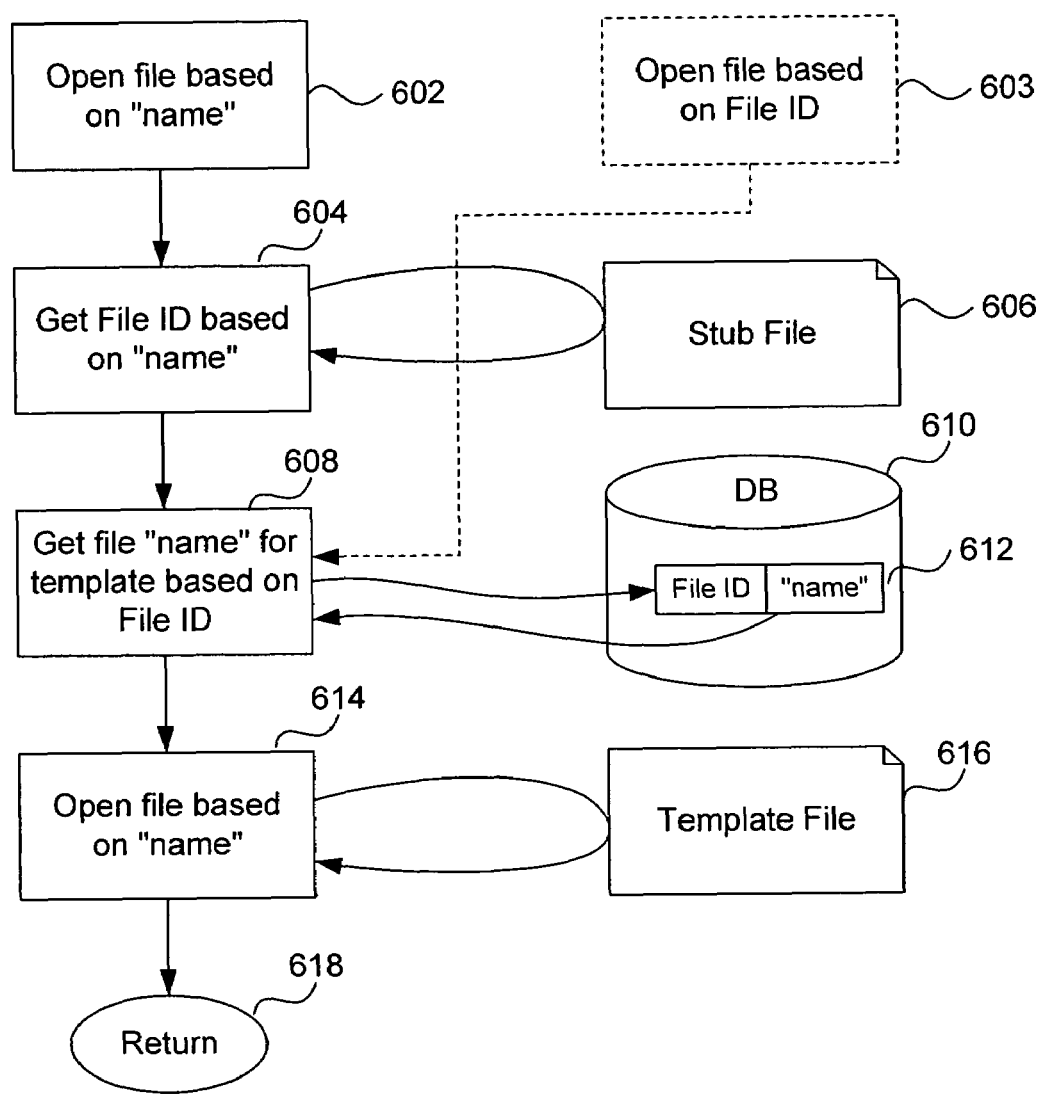
FIG. 6 is an illustration of a read-only access process according to a second embodiment of the present invention.

FIG. 6 is an illustration of a read-only type access process according to another embodiment of the present invention. As shown in FIG. 6, several constructs are used to effect the file access. The first construct is a stub file 606, which is used to represent template files 616 (only one file 616 is shown in FIG. 6 although in practice there may be multiple files 616). Template files 616 are the original operating system files (in other words, the original word.exe files, etc., that the operating system makes available to the VPSs and their users). The template file 616 may be referred to as a shareable file in a sharable tree.

Technically in Windows-like OS and file systems, the present invention allows emulation of links with appropriate properties on the base of stub files. In such a case, the embodiment described mentioned above regarding implementation using links or pointers will be directly applicable to such a case, the only difference will be in a way to understand that particular file is a special (file-system supported ioctls in Unix-like systems can be used, and the database 610-like structure can be used in Windows-like cases). Below, another implementation is described, which gives less overhead than the "direct link emulation" approach.

The stub file 606 therefore contains some information about the template file 616. Examples of this information are file name, file attributes, etc. If the template file 616 were attempted to be modified by the user, another copy of the template file 616 will be generated, and the stub file will no longer refer to the original template file 616, but will instead include a local (modified) copy of the original template file 616 with which the user works subsequently.

Note that FIG. 6 is directed at the read-only case, where no modification of the template file 616 is requested.

It is desirable for the user, in the event the user wants to work with the template file 616, to have his own copy of the template file 616 (which may be a virtual copy, or may be an actual copy). This process should be transparent to the user. In other words, the user should not be aware of a difference between a copied (modified) template file 616 and an actual (original) template file 616 (except that the user obviously knows if he has made modifications to the template file 616, but the existence of other template files 616 is masked from the user). A local copy of template file can exist on a partial or "on-demand" basis. That is only those portions of this original template file 616 that the user requested for reading or writing will be present in the stub file 606.

Another example is read-only files in the context of data warehousing to be used in data mining algorithms. Large arrays of data typically used in such algorithms are on a read-only basis. Thus, it is desirable to imitate an independent file system for each such VPS. The user of each VPS sees a file system as if that VPS represent an entire fully functional remote computer system (rather than merely a Virtual Private Server).

A typical example of read-only file access is an access to file to execute it as a process in the OS. In the context of this discussion, that image file is located at a particular place and is referred to as a template file 616. The stub file 606 is an "imitation" of the template file 616. Normally, a host would have one template file 616 for a particular application (in other words, only one template file 616 for word.exe, only one template file 616 for wordperfect.exe, only one template file 616 for a system read-only database, etc.). However, each VPS will have its own stub file 606 for the corresponding template file 616. In other words, if one hundred VPSs all require the use of word.exe, there will be one template file 616 for word.exe, but one hundred stub files 606 corresponding to the word.exe template file 616. (Note that in some cases there may be more than one template file 616, e.g., if multiple versions of Microsoft Word are supported by the operating system, then there may be template files 616 for each such version.)

Each VPS also has its associated database 610 used by the file system of that VPS. Technically, all VPSs can share a single instance of database 610, although each VPS can have its own dedicated instance of the database 610. Normally, the user of the VPS does not see the database 610. Thus, the stub file 606 exists within a VPS, while the database 610 normally exists outside the VPS (i.e., within the operating system). Each such database 610, however, is normally tied to a particular VPS. Note also that, while using the database 610 is preferred for convenience, the operating system can also maintain the relevant information directly, without using a database.

A typical stub file 606 is a file of "0 size" and has the same name as the template file 616 that it "imitates." This stub file, being a "normal" file from the operating system point of view, has a set of standard file attributes, which can be used to represent some shared file-related information. Yet another option is to use some other file identifier mechanism in the stub file 606. For example, the stub file 606 itself can be a link to the file address of the template file 616, or it could be a special file stream in terms of the Windows NT/XP/2000/2003 file system, or all information related to stub file can be stored in separate VPS storage.

The database 610 contains a set of records 112 with record fields of file ID and file name. Each such stub file 606 has a corresponding file ID with a corresponding value that can be obtained by means of operation system file system driver (this corresponds to the UNIX concept of inodes). Every file ID is a unique value within a particular file volume. Normally, the user does not see the file ID, although there are certain system APIs that may be used to query the file system driver to return the file ID of a particular file. Thus, FIG. 6 also describes the process of opening a file in read-only mode as if the user had his own template file 616.

As shown in FIG. 6, the process starts with receiving a request to generate or open a file based on a name (step 602). As a practical matter, this may occur when a user clicks on an icon to activate an application such as Microsoft Word.

The next step is to get the file ID that corresponds to the name of the file, from the stub file 606 (step 604). The next step is to query the database 610, using the file ID received from the stub file 606 to get the file name (or some information from which this name can be derived) from the database record 612. The data returned from the database 610 can be used by an algorithm to generate the name of the appropriate template file 616. In step 614, the requested operation to open the file is performed, using the template file 616. In this step, the name received in step 602 is replaced with the name received in step 608. The result of this operation is returned in step 618 to the caller of the process. In the case of successful opening of the file, a handle to the file can be returned, and in the case of failure, a corresponding error message can be returned.

An alternative way to reach step 608 is if the process tries to open the file based on the file ID (see step 603). If the file ID is known, then the process can proceed directly to step 608.

Normally, in an operating system, in order to open the file, first a handle corresponding to the file, or some corresponding file descriptor, must be received or defined. That file can then be operated on. At the time of opening the file, the caller identifies the set of operations (e.g., read, write, execute, delete, etc.) that he intends to perform on the file. If the file has been opened with read-only rights, and the user attempts to modify that file, the operating system will return an error message. Upon completion of a read from the file, the file handle is closed (or deleted), indicating that the user no longer has a need for that file. In other words, FIG. 6 in effect describes the process according to one embodiment of the present invention of how to generate a handle in a read-only scenario.

Figure 7:
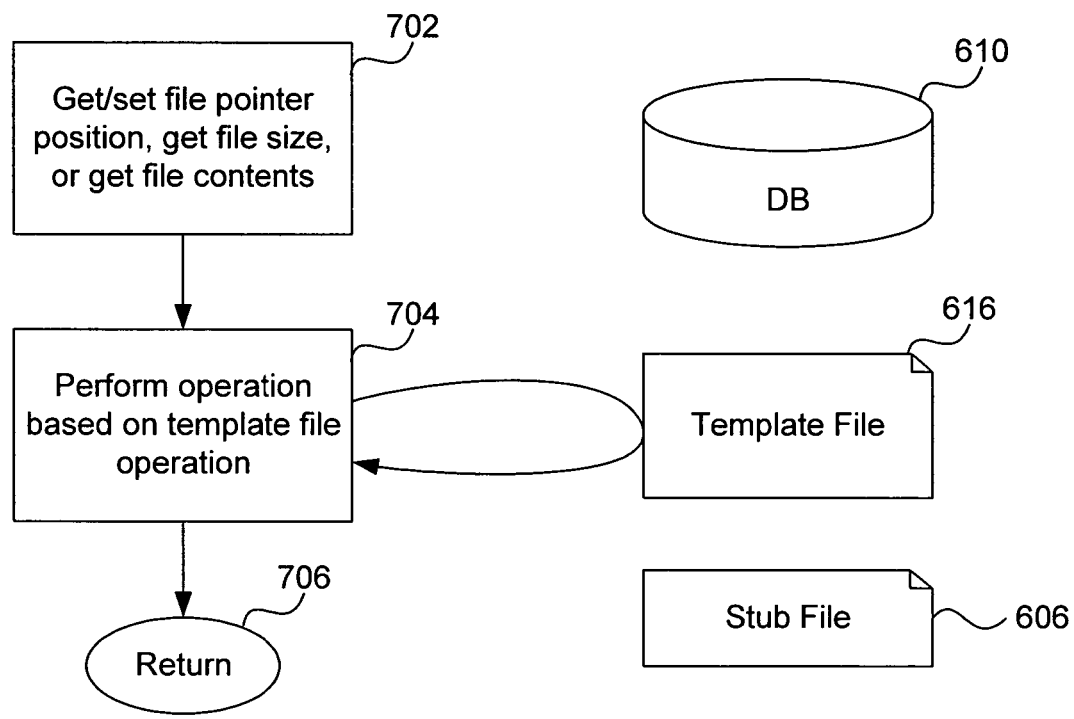
FIG. 7 describes the file operations once a file was opened and a handle has been received according to the second embodiment of the present invention.

FIG. 7 illustrates file operations once a handle has been opened or generated. In step 702, once the handle has been generated, the next step is to get the file position, file size, file contents (file data) using the handle. The information for step 702 comes from the template file 616. Note that this information cannot generally be derived from the stub file 606, since the stub file 606 is an imitation file and not a genuine copy of the template file 616.

In step 704, the read operation is performed on the template file 616, based on the information obtained in step 702. The information is then returned back to the caller (step 706). This operation is performed transparently to user. Note that the template file 616 is never modified by a user or by a VPS. The template file 616 can only be modified by the operating system.

Figure 8:
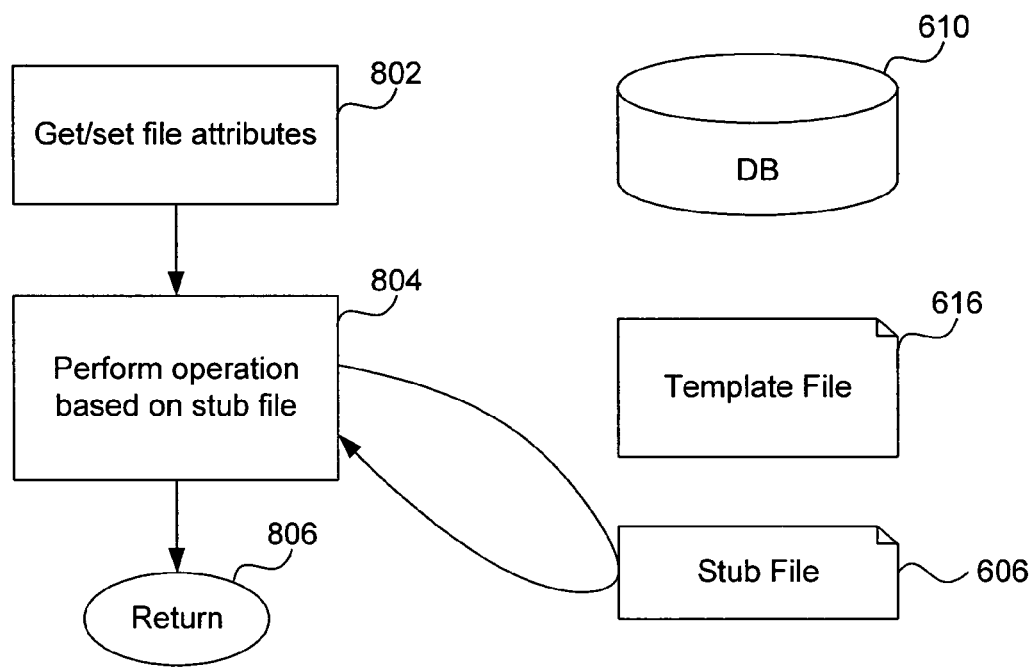
FIG. 8 illustrates read operations on the file that are associated with metadata according to the second embodiment of the present invention.

FIG. 8 relates to read operations on the file that are associated with metadata. The metadata is sometimes called "file attributes." These file attributes include such information as a file author, date of creation, date of last modification, access rights, etc. This information is stored in the stub file 606, whether inside file itself or as appropriate attributes of the stub file 606. As shown in FIG. 8, the first step is to get/set (i.e., to read or write) file attributes (step 802). Note that in this case (unlike in the case of FIG. 7, which applies to read-only operations on the file contents of the template file 616), it is possible to both read and write (modify) the file attributes, since the writing is done to the stub file 606, which is a local entity in the VPS. The next step 804 is to perform the operation (read or write) relating to the file attributes. After the operation is performed, the result is returned (step 806).

Figure 9:
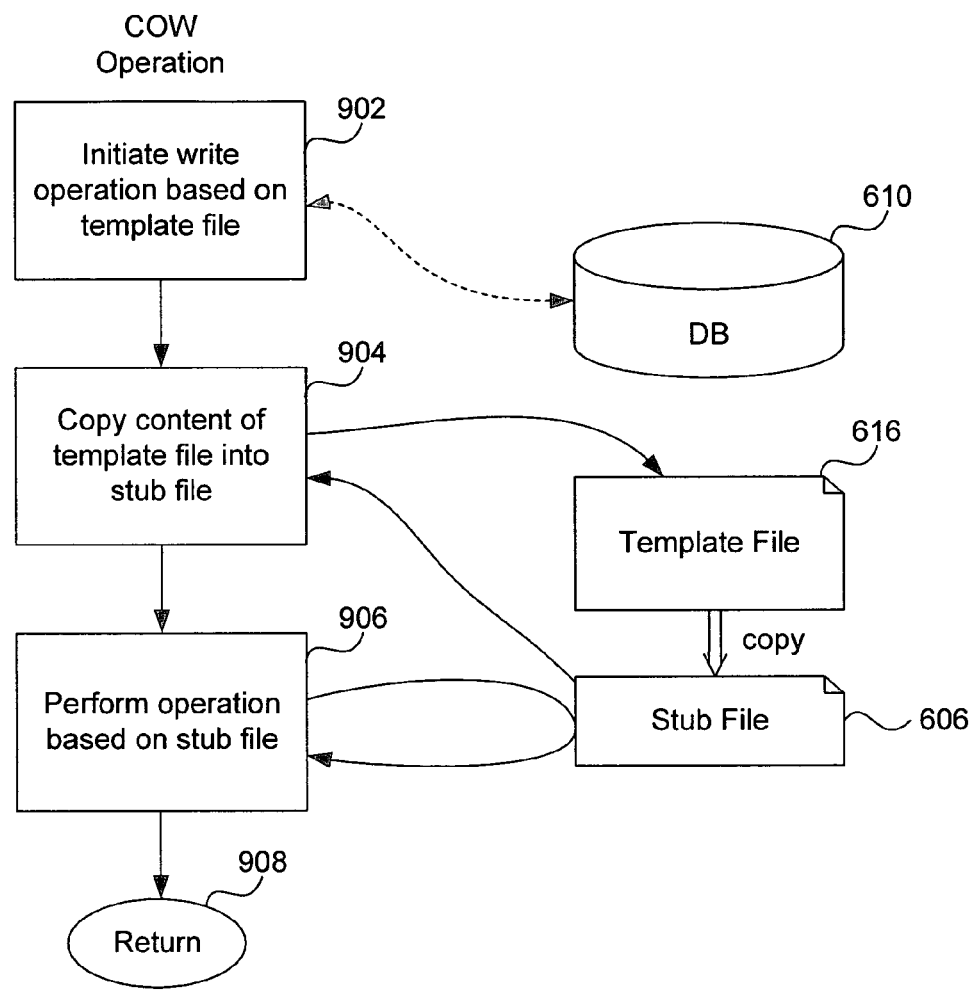
FIG. 9 illustrates the process of a copy on write (COW) operation during write access to shared file according to the second embodiment of the present invention.

FIG. 9 illustrates the process of a copy on write (COW) operation or a process of modifying a template file 616 by the user. Recall that the user is actually forbidden to modify the original template file 616. Starting at step 902, a request is received to initiate a write operation on the template file 616. Since the operating system cannot permit a modification of the original template file 616 itself (because if it were modified, all the VPSs will "see" that modification), the contents of the template file 616 is then copied into the stub file 606 (step 904). Thus, the stub file 606 is no longer a zero length file, but is now equal in size to the original template 616 file. In the next step 906, the write operation is performed on the stub file 606, where the stub file 606 "stands in" for the original template file 616. After the COW operation, all subsequent operations by this VPS on the template file (read, write and executable) will be performed on the stub file 606 that has the modified copy of the template file 616. The dashed line between the database 610 and step 902 indicates that, as an optional step, the database 610 may be queried to determine whether the stub file 606 has been previously modified and now holds the copy of the template file 616 for this VPS, or whether the original system template file 616 should be used as a starting point. There is no requirements to this operation to call database 610; because for example, the fact that such a file became non-zero length file after COW operation can be used, instead of a direct call to the database 610.

Note that once a particular VPS or a particular process within a VPS no longer has a need for the record 612 in the database 610, the database 610 can be "cleaned up" and unnecessary records 612 deleted. In other words, with regards to step 603, the file ID may be viewed as an attribute like any other file attribute discussed in reference to FIG. 8.

In the proposed algorithm, typically all the information for a shared file is stored in a single location (though this location can be different for different data types) to avoid a costly and complex operation of data synchronization between different locations.

One of the advantages of the method described above is the file structure stored inside the file system itself does not need to be modified in any substantial way. The approach described above can be an add-on to virtually any file system. The existing file system is used as a basis for implementing the present invention. Note also that the present invention is also applicable to the rename file function because of transparent support of "rename" semantics.

Figure 10:
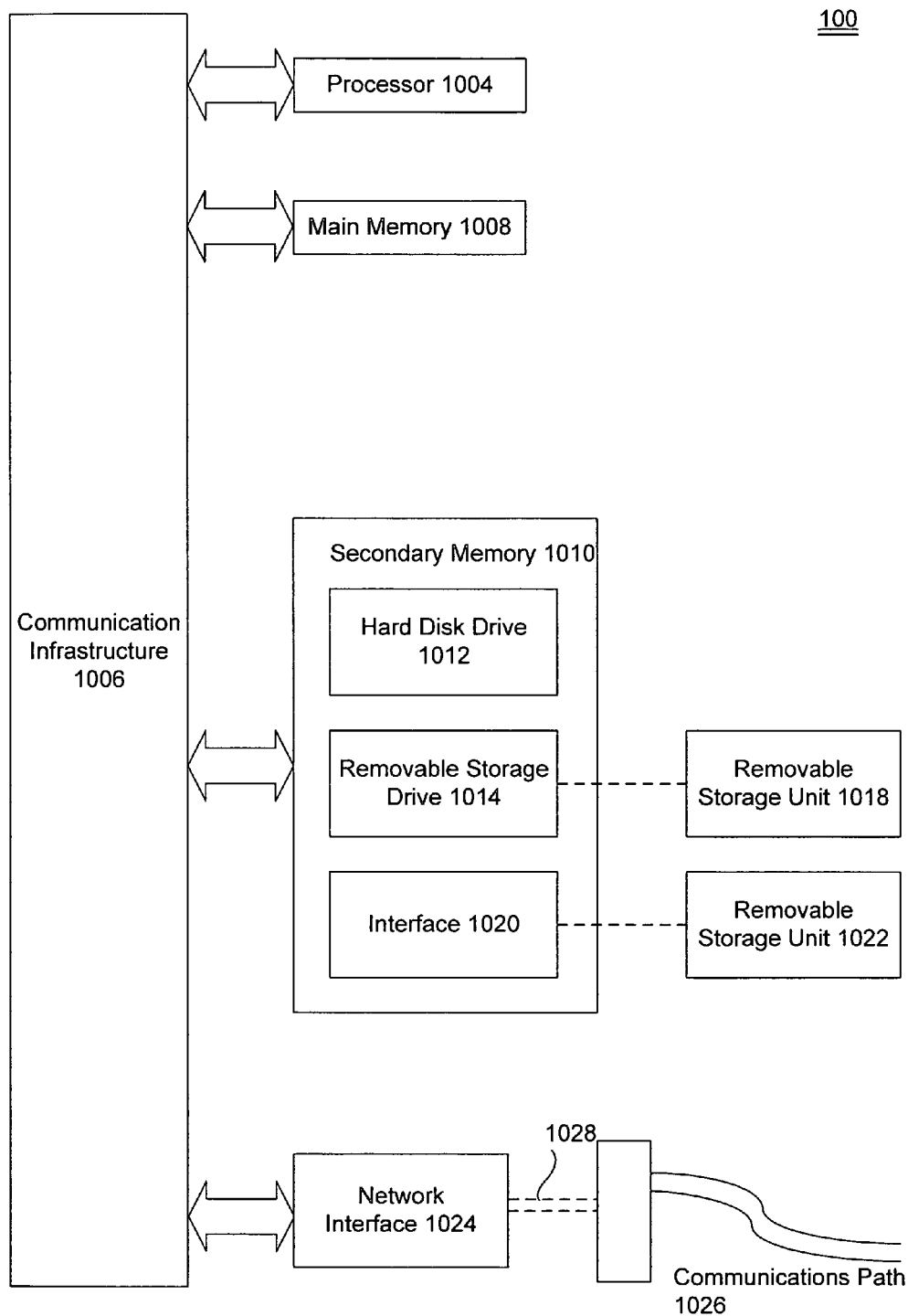
FIG. 10 illustrates an example of a computer architecture that may be used in the present invention.

An example of a computer system, or host, where the present invention may be used is illustrated in FIG. 10. The computer system 100 includes one or more processors, such as processor 1004. The processor 1004 is connected to a communication infrastructure 1006, such as a bus or network). Various software implementations are described in terms of this exemplary computer system. After reading this description, it will become apparent to a person skilled in the relevant art how to implement the invention using other computer systems and/or computer architectures.

Computer system 100 also includes a main memory 1008, preferably random access memory (RAM), and may also include a secondary memory 1010. The secondary memory 1010 may include, for example, a hard disk drive 1012 and/or a removable storage drive 1014, representing a magnetic tape drive, an optical disk drive, etc. The removable storage drive 1014 reads from and/or writes to a removable storage unit 1018 in a well-known manner. Removable storage unit 1018 represents a magnetic tape, optical disk, or other storage medium that is read by and written to by removable storage drive 1014. As will be appreciated, the removable storage unit 1018 can include a computer usable storage medium having stored therein computer software and/or data.

In alternative implementations, secondary memory 1010 may include other means for allowing computer programs or other instructions to be loaded into computer system 100. Such means may include, for example, a removable storage unit 1022 and an interface 1020. An example of such means may include a removable memory chip (such as an EPROM, or PROM) and associated socket, or other removable storage units 1022 and interfaces 1020 which allow software and data to be transferred from the removable storage unit 1022 to computer system 100.

Computer system 100 may also include one or more communications interfaces, such as communications interface 1024. Communications interface 1024 allows software and data to be transferred between computer system 100 and external devices. Examples of communications interface 1024 may include a modem, a network interface (such as an Ethernet card), a communications port, a PCMCIA slot and card, etc. Software and data transferred via communications interface 1024 are in the form of signals 1028 which may be electronic, electromagnetic, optical or other signals capable of being received by communications interface 1024. These signals 1028 are provided to communications interface 1024 via a communications path (i.e., channel) 1026. This channel 1026 carries signals 1028 and may be implemented using wire or cable, fiber optics, an RF link and other communications channels. In an embodiment of the invention, signals 1028 comprise data packets sent to processor 1004. Information representing processed packets can also be sent in the form of signals 1028 from processor 1004 through communications path 1026.

The terms "computer program medium" and "computer usable medium" are used to generally refer to media such as removable storage units 1018 and 1022, a hard disk installed in hard disk drive 1012, and signals 1028, which provide software to the computer system 100.

Computer programs are stored in main memory 1008 and/or secondary memory 1010. Computer programs may also be received via communications interface 1024. Such computer programs, when executed, enable the computer system 100 to implement the present invention as discussed herein. In particular, the computer programs, when executed, enable the processor 1004 to implement the present invention. Where the invention is implemented using software, the software may be stored in a computer program product and loaded into computer system 100 using removable storage drive 1014, hard drive 1012 or communications interface 1024.

In an embodiment of the present invention, because modified files are stored inside private areas that are dedicated for each VPS, VPS-specific disk quotas can be easily implemented by restricting a real disk space utilization inside the private area. In that case, disk quotas are "counted against" a VPS only for real utilization of space. Shared areas are not counted against the VPS disk quota. The disk quota can be implemented based on a full path, which is implemented as a VPS-wide quota, and the private files of a VPS are place in a single directory (with single root). An example of how disk quotas may be implemented is described in commonly-assigned, co-pending U.S. patent application Ser. No. 10/670,093, entitled "Method of Implementation of Data Storage Quota", filed on Sep. 24, 2003, which is incorporated by reference herein, and also discussed below.

In one embodiment of the present invention, before usage of the quota data file, the quota data file needs to be initialized and filled out with initial values of parameters of data storage space or other quantitative parameters of resource consumption usage for unique identifiers and groups inside of the area of used quantitative parameters of resource consumption calculation. This can be defined by a computer system administrator or any other system of automatic quota control.

Quota parameters in one embodiment of the present invention can depend on the file system and can be as follows:

1. a number of blocks occupied by data of one user partially or entirely for the file system, implemented above the block storage;

2. a sum of sizes of all files belonging to a user or user group(s);

3. number of structures available to the user for the file system using special data structures associated to a file, for example, number of inodes in UNIX systems;

4. number or other parameters of service operations performed by the operating system to serve any user or group of users for a period of time, for example, a number of backup operations, or the size or quantitative parameter of resource of backup copies, or a number of disk operations done per a period of time; and/or 5. time and range of changes of other consumption parameters, allowed for usage by users that modify limits already set up, for example, a user may be allowed to temporarily violate the quota for occupied resources (so called "soft quota"), but for a strictly limited time and within some specific limit (sometimes called a "hard quota"); i.e., a soft limit, which may be converted to a hard limit after, for example, a violation exceeds a predetermined time.

In one embodiment of the present invention, the area of computation of the space used by the file system can be defined as one or several subtrees of the computer file system where each of the subtrees can include only one mounting area. For example, referring now to FIG. 11, the file system of computer system 100 comprises a base part of system 1105 and mounted sub-area 1102 with the access path 1101 /usr/bin. The quota area 1104 lies on the search path below directory /usr and includes all files of the base area composing 1104, but does not include files lying in the mounting area 1102. That is, for example, the file /usr/local/bin/gcc belongs into the area of quoting, but files from subdirectory /var or the file /usribin/X11/xclock will not. The area 1102 may be used as the private area of a VPS for storage of stub files 606.

Figure 11:
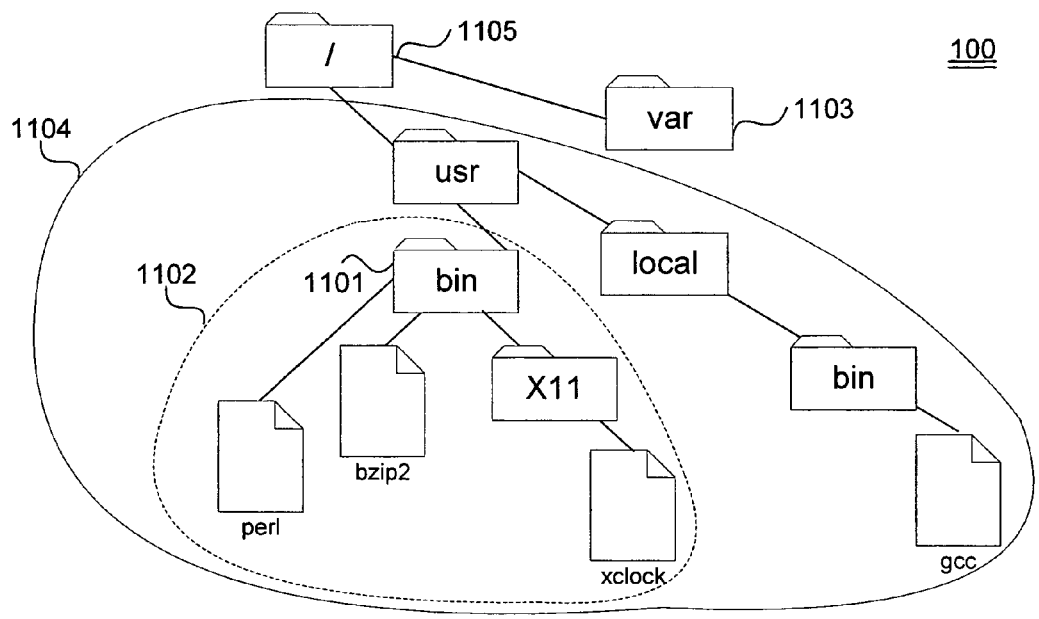
FIG. 11 illustrates an exemplary disk space or other quantitative parameter of resource consumption used by a file system for Virtual Private Server data stored in a private area, in accordance with an embodiment of the present invention.

In the context of the embodiment shown in FIG. 11, belonging to the quota area is defined by the full access path to the file and this is done during opening of the file. If the full access path contains the path's part belonging to the area of quoting, starting from the directory root, then the file is considered belonging to the area of quoting. Thus, for example, the file /usr/local/bin/gcc (or the single file node) on FIG. 11 belongs to the quota area 1104 because its full path contains the part "/usr/" which describes the area of quoting. Technically, in an alternative embodiment, the definition of belonging can be by direct comparison of access paths as well as by other means, for example, by recursive setting of an attribute of belonging of all files of the given subdirectory of the given quota area if the directory itself has such an attribute.

For each quota area, a set of quota parameters is defined. For example, in an embodiment of the present invention used in UNIX OS, a standard set of quota parameters is the size of occupied disk space and number of inodes (e.g., the number of files that can be generated by a user). Other values depending on the type of a data storage and file system can be used as quota parameters.

Having thus described a preferred embodiment of a system and method for providing file-sharing in a computer system to allow multi-user access, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of accessing a shareable computer file, comprising:

generating private areas and stub files for a plurality of Virtual Private Servers (VPSs), wherein the stub files of each VPS correspond to the shareable computer file, and wherein each VPS operates as a fully functional computer for providing services to users;

selecting a VPS for responding to a request to access the shareable computer file;

receiving, at the VPS, the request to access the shareable computer file;

retrieving, at the selected VPS, a file ID based on a stub file corresponding to the shareable computer file, wherein the file ID is a property of the stub file, and wherein the stub file is stored in a corresponding private area of the selected VPS;

copying the shareable computer file content into the stub file if a user attempts to modify the shareable computer file, and after looking up, by using the file ID, that the file is a stub file, wherein any modifications are made to the copy;

accessing, inside the selected VPS, the modified copy if modifications have been made; and accessing, by the selected VPS, based on the file ID, the shareable computer file if modifications have not been made.

2. The method of claim 1, further comprising creating a database that includes information for deriving corresponding file names for a plurality of files.

3. The method of claim 2, further comprising retrieving the shareable computer file name from the database, wherein the shareable computer file name corresponds to the file ID.

4. The method of claim 2, further comprising creating a file tree for the shareable computer files.

5. The method of claim 2, wherein the database is provided by the operating system for use by the Virtual Private Server.

6. The method of claim 2, wherein the operating system provides access to the database.

7. The method of claim 1, further comprising creating the stub file in the private area of the Virtual Private Server prior to the step of retrieving the file ID.

8. The method of claim 1, wherein the modified copy of the shareable computer file includes only a portion of the shareable computer file that the user has attempted to modify.

9. The method of claim 1, further comprising installing restrictions on use of resources by each Virtual Private Server.

10. The method of claim 9, wherein the resources include:
disk quota;
file number quota;
disk I/O bandwidth quota; and
rate of opening files per unit time.

11. The method of claim 1, wherein the shareable computer file, if modifications have not been made, is shared on a disk between different instances of the Virtual Private Servers.

12. The method of claim 1, wherein the shareable computer file, if modifications have not been made, is shared in computer memory between different instances of the Virtual Private Servers.

13. The method of claim 1, wherein the stub file includes a modified copy of the shareable computer file if the shareable computer file was attempted to be modified, and wherein the stub file refers to the shareable computer file if the user has not attempted to modify the shareable computer file.

14. The method of claim 1, wherein, if the user has not attempted to modify the shareable computer file, a read-only operation retrieves any of file contents, file pointer position and file size from the shareable computer file.

15. The method of claim 1, wherein, if the user has not attempted to modify content of the shareable computer file, the stub file is a zero size file.

16. The method of claim 1, further comprising retrieving file attributes relating to the shareable computer file from the stub file.

17. A system for accessing a shareable computer file, comprising:
means for generating private areas and stub files for a plurality of Virtual Private Servers (VPSs), wherein the stub files of each VPS correspond to the shareable computer file, and wherein each VPS operates as a fully functional computer for providing services to users;
means for selecting a VPS for responding to a request to access the shareable computer file;
means for receiving, at the selected VPS, the request to access the shareable computer file;
means for retrieving a file ID based on a stub file corresponding to the shareable computer file, wherein the file ID is a property of the stub file, and wherein the stub file is stored in a corresponding private area of the selected VPS;
means for copying the shareable computer file content into the stub file if a user attempts to modify the shareable computer file, and after looking up, by using the file ID, that the file is a stub file;
means for accessing, by the selected VPS, based on the file ID, the modified copy if modifications have been made; and
means for accessing, by the selected VPS, the shareable computer file if modifications have not been made.

18. A computer readable medium having computer executable program logic stored thereon for executing on a processor for accessing a shareable computer file, the computer program logic comprising:
computer program code means for generating private areas and stub files for a plurality of Virtual Private Servers (VPSs), wherein the stub files of each VPS correspond to the shareable computer file, and wherein each VPS operates as a fully functional computer for providing services to users;
computer program code means for selecting a VPS for responding to a request to access the shareable computer file;
computer program code means for receiving, at the selected VPS, the request to access the shareable computer file;
computer program code means for retrieving, by the selected VPS, a file ID based on a stub file corresponding to the shareable computer file, wherein the file ID is a property of the stub file, and wherein the stub file is stored in a corresponding private area of its VPS;
computer program code means for copying the shareable computer file content into the stub file if a user attempts to modify the shareable computer file, and after looking up, by using the file ID, that the file is a stub file;
computer program code means for accessing, by the selected VPS, based on the file ID, the modified copy if modifications have been made; and
computer program code means for accessing, by the selected VPS, the shareable computer file if modifications have not been made.

19. A system for concurrent accessing of files by multiple users, comprising:
a plurality of Virtual Private Servers (VPSs) having private areas, wherein each VPS operates as a fully functional computer for providing services to users;
a plurality of shareable computer files maintained by the operating system;
a database including records with file IDs and information for deriving file names of the shareable computer files; and
a plurality of stub files for use by the VPSs, wherein the stub files of each VPS correspond to the shareable computer file; and
the file IDs are derivable from the stub files and correspond to those shareable computer files that a user has not attempted to modify,
the file IDs reference the stub files such that the system determines, by looking up the file ID in the database, whether the file is a stub file,
the stub files are stored in a corresponding private area of the corresponding VPS; and
the stub files include modified contents of the shareable computer files for those shareable computer files that the user has attempted to modify.

20. The system of claim 19, wherein the stub files include file attributes of corresponding shareable computer files.

21. The system of claim 19, wherein, if the user has not modified a particular shareable computer file, a read-only operation to retrieve any of file position, file size and file contents retrieves them from the particular shareable computer file.

22. The system of claim 19, wherein the database exists in operating system space.

23. The system of claim 19, wherein the operating system provides access to the database.

24. The system of claim 19, wherein the file name is stored in the database and corresponds to the file ID.

25. The system of claim 19, wherein the database includes information for deriving the file name based on the file ID.

26. The system of claim 19, further comprising a file tree for the shareable computer files.

27. The system of claim 19, wherein the database is provided by the operating system for use by the corresponding Virtual Private Server.

28. The system of claim 19, wherein the modified copy of the shareable computer file includes only a portion of the shareable computer file that the user has attempted to modify.

29. The system of claim 19, wherein each Virtual Private Server includes restrictions on its use of system resources.

30. The system of claim 29, wherein the system resources include disk quota and file number quota.

31. The system of claim 29, wherein the restrictions include flexible limits and fixed limits on the use of system resources.

32. The system of claim 31, wherein the flexible limits become fixed limits after a predetermined period of restriction violation.

33. The system of claim 19, wherein the stub file includes a modified copy of the shareable computer file if the shareable computer file was attempted to be modified, and wherein the stub file refers to the shareable computer file if the user has not attempted to modify the shareable computer file.

34. The system of claim 19, wherein, if the user has not attempted to modify the shareable computer file, a read-only operation retrieves any of file contents, file position and file size from the shareable computer file.

35. The system of claim 19, wherein the stub files include file attributes relating to corresponding shareable computer files.

36. The method of claim 1, further comprising removing correspondence between the file ID and the shared file if modifications have been made.

\* \* \* \* \*